US010073474B2

(12) United States Patent
Arno et al.

(10) Patent No.: US 10,073,474 B2
(45) Date of Patent: Sep. 11, 2018

(54) DEVICE FOR CONTROLLING A CURRENT IN A LOAD HAVING AN UNKNOWN CURRENT-VS.-VOLTAGE CHARACTERISTIC

(71) Applicant: STMicroelectronics (Alps) SAS, Grenoble (FR)

(72) Inventors: Patrik Arno, Sassenage (FR); Alexandre Balmefrezol, Sassenage (FR)

(73) Assignee: STMicroelectronics (Alps) SAS, Grenoble (FR)

( * ) Notice: Subject to any disclaimer, the term of this patent is extended or adjusted under 35 U.S.C. 154(b) by 30 days.

(21) Appl. No.: 15/251,289

(22) Filed: Aug. 30, 2016

(65) Prior Publication Data

US 2017/0235320 A1 Aug. 17, 2017

(30) Foreign Application Priority Data

Feb. 11, 2016 (FR) ..................................... 16 51114

(51) Int. Cl.
*G06F 1/20* (2006.01)
*G05F 1/46* (2006.01)

(52) U.S. Cl.
CPC ..................................... *G05F 1/46* (2013.01)

(58) Field of Classification Search
CPC .................................... G05F 1/20; G05F 1/46
USPC ......................... 323/234, 266, 271–289, 315
See application file for complete search history.

(56) References Cited

U.S. PATENT DOCUMENTS

| | | | | | |
|---|---|---|---|---|---|
| 5,091,837 | A * | 2/1992 | Duspiva | H02M 3/33576 | 363/15 |
| 5,999,433 | A * | 12/1999 | Hua | H02M 3/337 | 363/132 |
| 6,717,390 | B2 * | 4/2004 | Miyazaki | H02M 3/33576 | 323/284 |
| 6,737,840 | B2 * | 5/2004 | McDonald | H02M 3/156 | 323/271 |
| 7,425,819 | B2 * | 9/2008 | Isobe | H02M 3/156 | 323/222 |
| 7,440,297 | B2 * | 10/2008 | Adragna | H02M 1/32 | 323/222 |
| 8,188,719 | B2 * | 5/2012 | Sudou | G05F 1/575 | 323/242 |
| 2010/0181977 | A1 * | 7/2010 | Sohma | H02M 3/156 | 323/282 |
| 2012/0187863 | A1 | 7/2012 | Nonaka et al. | | |
| 2013/0307339 | A1 | 11/2013 | Subramanium et al. | | |

(Continued)

OTHER PUBLICATIONS

INPI Search Report and Written Opinion for FR 1651114 dated Oct. 3, 2016 (7 pages).

*Primary Examiner* — Adolf Berhane
*Assistant Examiner* — Nusrat Quddus
(74) *Attorney, Agent, or Firm* — Crowe & Dunlevy

(57) ABSTRACT

A method of controlling a current flowing through a load including the steps of: applying a first transfer function representative of the load to a first voltage to obtain a second voltage; applying the second voltage to a first terminal of a circuit for generating the current; sampling a third voltage between first and second terminals of the load; comparing the third voltage with the second voltage; and determining the current to be supplied to the load according to the result of the comparison.

33 Claims, 3 Drawing Sheets

Fig 2

(56) References Cited

U.S. PATENT DOCUMENTS

| | | | | |
|---|---|---|---|---|
| 2014/0062441 | A1* | 3/2014 | Butler | H03F 1/52 323/282 |
| 2014/0300330 | A1* | 10/2014 | Sugiyama | H02M 3/156 323/271 |

* cited by examiner

DEVICE FOR CONTROLLING A CURRENT IN A LOAD HAVING AN UNKNOWN CURRENT-VS.-VOLTAGE CHARACTERISTIC

PRIORITY CLAIM

This application claims the priority benefit of French application for Patent No. 1651114, filed on Feb. 11, 2016, the disclosure of which is hereby incorporated by reference in its entirety to the maximum extent allowable by law.

TECHNICAL FIELD

The present disclosure generally relates to electronic circuits, and more particularly to current control devices for loads having an unknown current-vs.-voltage characteristic.

BACKGROUND

Current control devices for unknown loads generally comprise a current source which imposes the current in the load and a resistor which enables to regulate the current in the unknown load. The resistor induces a significant energy loss.

It is thus needed to improve the energy performance of current control devices for unknown loads.

SUMMARY

Thus, an embodiment provides improving the electric power consumption of current control devices of loads having an unknown current-vs.-voltage characteristic.

An embodiment provides a method of controlling a current flowing through a load, comprising the steps of: applying a first transfer function representative of the load to a first voltage to obtain a second voltage; applying the second voltage to a first terminal of a circuit for generating said current; sampling a third voltage between first and second terminals of the load; comparing the third voltage with the second voltage; and determining the current to be supplied to the load according to the result of the comparison.

According to an embodiment, the first transfer function is determined by the steps of: a) coupling the second terminal of the load to a resistor coupled to a terminal of application of a ground; b) initializing the first transfer function; c) constructing a second transfer function representative of the load by determining, for a plurality of values of the first voltage, the value of the current for which the value of the voltage sampled across the load is equal to the value of the first voltage having the first transfer function applied thereto; d) using a function inverse of the second function to update the first function; e) repeating steps c) and d) until a condition is fulfilled; f) coupling the second terminal of the load to the terminal of application of the ground.

According to an embodiment, the initialization of the first function is performed so that for any value of the first voltage, the resultant of the transfer function is the actual value of the control voltage.

According to an embodiment, the initialization of the first function is performed by a first estimate of the characteristic of the load.

According to an embodiment, the inverse of the second function is calculated by an interpolation algorithm.

According to an embodiment, the inverse of the second function is calculated by calculating coefficients of a polynomial.

According to an embodiment, step c) comprises the steps of: c1) for each value of the first voltage, applying the first function to obtain the second voltage; c2) applying the second voltage to the first input terminal of the circuit for generating the current; c3) applying the current in the load so that the voltage sampled across the load is equal to the second voltage; c4) sampling a fourth voltage across the resistor; c5) calculating the current flowing through the load and the resistor by dividing the fourth voltage by said resistance.

According to an embodiment, the condition is considered as fulfilled when at least the result of an operation of composition of the first function with the second function is approximately equal to identity.

According to an embodiment, steps a) to f) are repeated periodically.

According to an embodiment, steps a) to f) are repeated when the operating conditions change.

According to an embodiment, a plurality of first functions are determined according to different operating conditions.

According to an embodiment, the load has its first terminal coupled to an output terminal of the current generation circuit, its second terminal being coupled to a terminal of application of the ground.

BRIEF DESCRIPTION OF THE DRAWINGS

The foregoing and other features and advantages will be discussed in detail in the following non-limiting description of specific embodiments in connection with the accompanying drawings, wherein.

DETAILED DESCRIPTION

Figure 1:
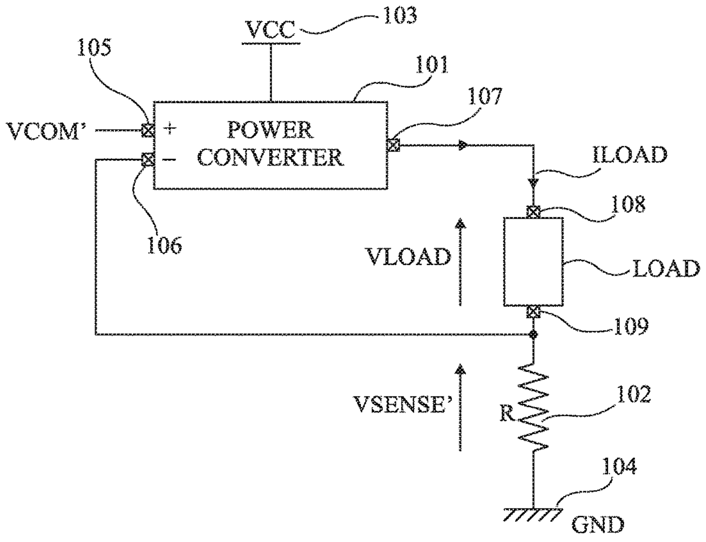
FIG. 1 shows an example of a usual device for controlling the current in a load.

The same elements have been designated with the same reference numerals in the different drawings. For clarity, only those elements which are useful to the understanding of the described embodiments have been shown and are detailed. In the present description, term "connected" is used to designate a direct electric connection, with no intermediate electronic component, for example, by means of one or a plurality of conductive tracks or of one of a plurality of conductive wires, and term "coupled" or term "linked" is used to designate either a direct electric connection (then meaning "connected") or a connection via one or a plurality of intermediate components (resistor, diode, capacitor, etc.).

FIG. 1 shows a usual example of a current control device in a load having an unknown current-vs.-voltage characteristic. The device comprises a power converter 101, a load LOAD, and a resistor 102 of value R, in series between a first terminal 103 of application of a power supply potential VCC and a terminal 104 of connection to ground GND. Power converter 101 further comprises a first input terminal 105 having a control Voltage VCOM' applied thereto, a second input terminal 106 coupled to the terminal of resistor 102 which is not connected to ground, and an output terminal 107 coupled to a terminal 108 of load LOAD.

Load LOAD and resistor 102 conduct the same current ILOAD to within the error sampled by the second input terminal of converter 101. The error may be zero according to the nature of the input stage coupled to terminal 106. The value of a voltage VSENSE' across resistor 102 is equal to the product of the value of current ILOAD by value R of the resistor. Voltage VSENSE' thus is an image of current ILOAD flowing through load LOAD.

When a control voltage VCOM' is applied to first input terminal 105 of the power converter, the latter compares this voltage with voltage VSENSE' present on its second input terminal 106. The power converter thus determines the value of current ILOAD delivered to load LOAD to cancel the difference between voltages VCOM' and VSENSE'.

Such a device thus enables to control the current delivered in a load of unknown characteristic according to a control voltage. The disadvantage of this device is the energy loss due to the current flowing through resistor 102.

According to the embodiments described hereafter, it is thus provided to decrease energy losses due to the resistor.

Figure 2:
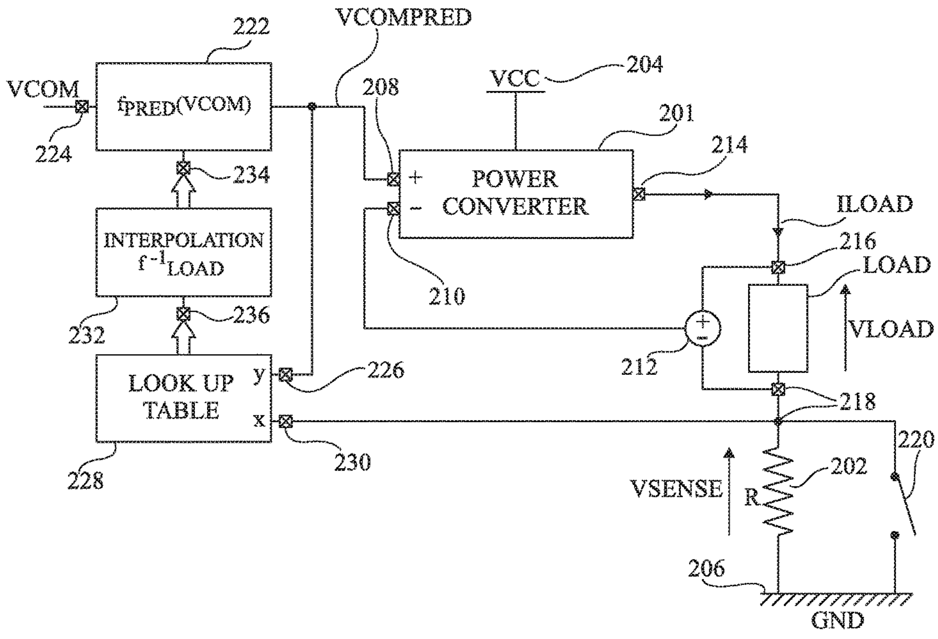
FIG. 2 shows an embodiment of a device for controlling the current in a load.

FIG. 2 shows an embodiment of a current control device in a load having an unknown current-vs.-voltage characteristic.

The device comprises a power converter 201, a load LOAD, and a resistor 202 of value R, in series between a first terminal 204 of application of a power supply potential VCC and a terminal 206 of connection to ground GND. Power converter 201 further comprises a first input terminal 208 having a voltage VCOMPPRED applied thereto, a second input terminal 210 coupled to a sensor 212 of the value of voltage VLOAD across load LOAD, and an output terminal 214 coupled to a terminal 216 of load LOAD. Another terminal 218 of load LOAD coupled to resistor 202 is also coupled to a terminal of a switch 220 having its other terminal connected to ground.

First input terminal 208 of power converter 201 is on the one hand coupled to a block 222 ($f_{PRED}$(VCOM)) which applies a transfer function $f_{PRED}$ to a voltage VCOM present on an input terminal 224. Terminal 208 is on the other hand coupled to an input terminal 226 of a circuit 228 (LOOK-UP TABLE) providing the correspondence between a voltage and a current from a table stored in a memory internal or external to circuit 228. Circuit 228 comprises another input terminal 230 coupled to terminal 218 of load LOAD. Circuit 228 may comprise one or a plurality of analog-to-digital converters to convert the analog signals present at its input terminals 226 and 230 into digital signals. Other embodiments may comprise one or more external analog-to-digital converters. Load LOAD and resistor 202 conduct the same current ILOAD to within the error of the current sampled by input terminal 230 of look-up circuit 228. The value of current ILOAD is thus obtained by division of a voltage VSENSE across resistor 202 by value R of the resistor: ILOAD=VSENSE/R. Look-up circuit 228 provides, for each value of VCOMPRED, the value of the corresponding current ILOAD.

An output terminal of circuit 228 is coupled to an input terminal 236 of a calculation block 232 (INTERPOLATION $f^{-1}_{LOAD}$) which calculates a function and its inverse function. An output terminal of calculation block 232 is coupled to a second input terminal 234 of block 222 of application of transfer function $f_{PRED}$.

Figure 4:
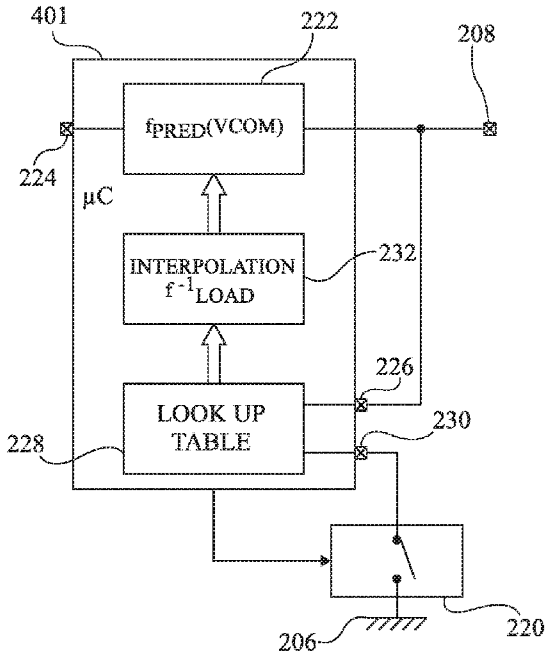
FIG. 4 shows an example of a microprocessor executing instructions of the embodiment of FIG. 2 or of the method of FIG. 3.

FIG. 4 shows an example of a microprocessor 401 integrating blocks 222, 232 and circuit 228 of FIG. 2. The microprocessor comprises terminals 224, 208, 226, and 230 of FIG. 2. The microprocessor also controls the state of switch 220 of the same drawing.

Figure 3:
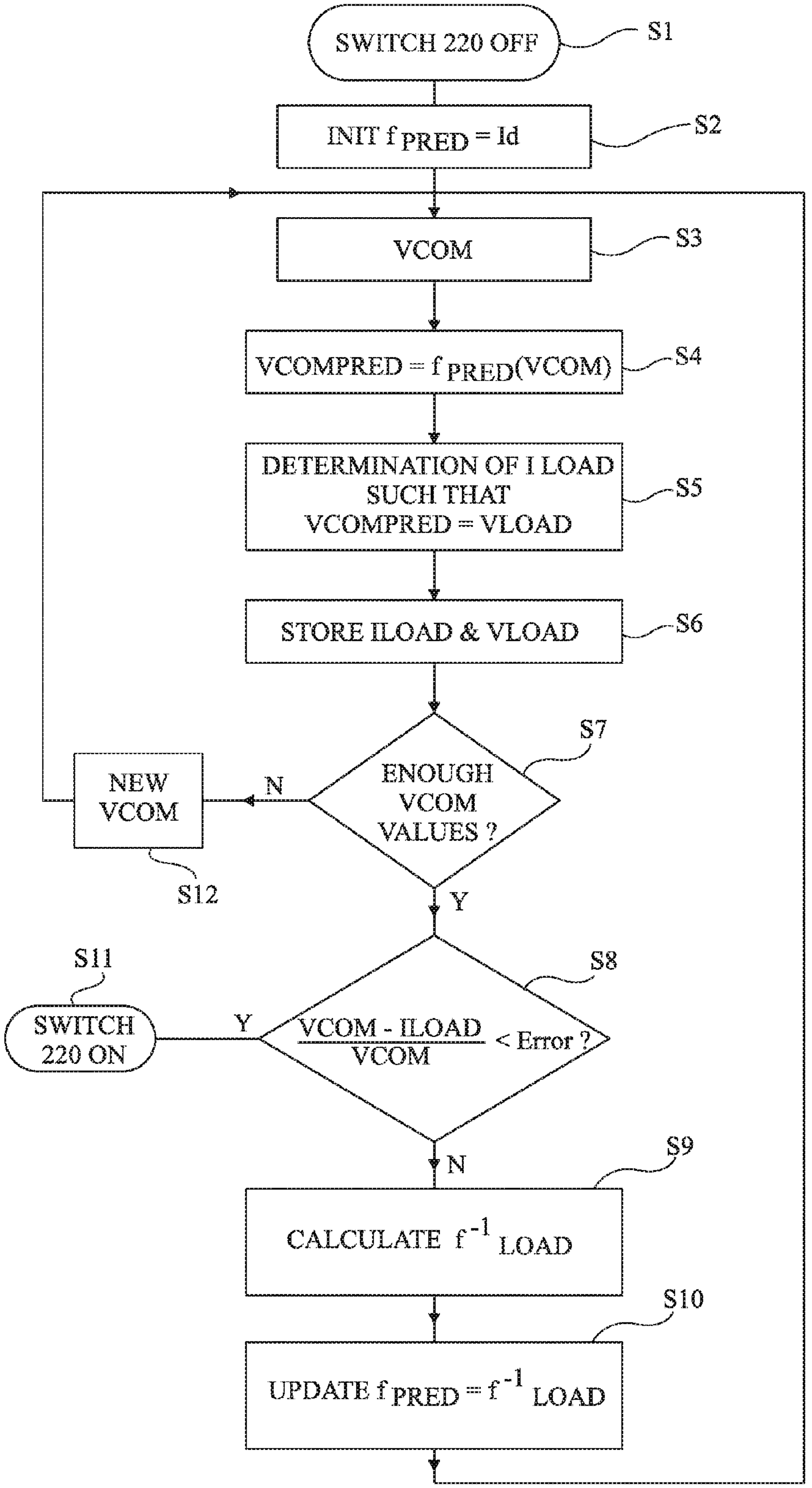
FIG. 3 shows different steps of a training method implemented in the embodiment described in FIG. 2.

FIG. 3 shows different steps of a training (calibration) method executed by the device of FIG. 2. These steps are for example controlled by a microprocessor which executes the functions of blocks 222, 232, and 228 and which controls the state of switch 220, as illustrated in FIG. 4.

At a first step S1 (SWITCH 220 OFF), switch 220 is turned off. At a second step S2 (INIT $f_{pred}$ Id), the transfer function of block 222 is initialized so that, for a voltage VCOM applied to input 224, output voltage VCOMPRED is equal to input voltage VCOM. At next steps S3 (VCOM) and S4 (VCOMPRED=$f_{pred}$(VCOM)), transfer function $f_{pred}$ of block 222 is applied to voltage VCOM present on terminal 224 to obtain voltage VCOMPRED. At a step S5 (DETERMINATION OF ILOAD SUCH THAT VCOMPRED=VLOAD), power converter 201 compares voltage VCOMPRED present on terminal 208 to voltage VLOAD present on terminal 210, and adjusts current ILOAD in the load to cancel the difference between the 2 voltages.

One thus has, at equilibrium, VLOAD=VCOMPRED and ILOAD=VSENSE/R. At a step S6 (STORE ILOAD & VLOAD), values VCOMPRED (that is, VLOAD) and ILOAD are respectively stored in look-up circuit 228 via terminals 226 and 230.

At a step S7 (ENOUGH VCOM VALUES?), the microprocessor assesses whether a sufficient number of voltage values VCOM has been applied to the device. If not (output N of block S7), at a step S12 (NEW VCOM), a new value of VCOM is applied and it is returned to step S3. The number of values to be applied to the device depends on the targeted application, according, for example, to the range of currents/voltages where the load is desired to be used. There may exist other criteria. An embodiment is to generate the different values of voltage VCOM in the form of a ramp, but other methods may be envisaged.

Due to the different iterations, look-up circuit 228 contains a description of a characteristic $f_{LOAD}$ of load LOAD such that: ILOAD=$f_{LOAD}$(VLOAD).

When the number of values VCOM is sufficient (output Y of block S7), then, at a step S8 ((VCOM−ILOAD)/VCOM<Error?)), it is assessed whether an error condition is fulfilled.

In an embodiment, the condition to be fulfilled is to have a transfer function $f_{pred}$ equal to an inverse function of function $f_{LOAD}$ which represents the characteristic of the load defined to within an error; or in other words, that the result of an operation of composition of $f_{pred}$ by function $f_{LOAD}$ describing the characteristic of load LOAD is approximately equal to identity.

If this condition is fulfilled (output Y of block S8), it is then proceeded to a step S11 (SWITCH 220 ON) where switch 220 is turned on.

In the opposite case (output N of block S8), it is then proceeded to a step S9 (CALCULATE $f^{-1}_{LOAD}$).

At step S9, calculation block 232 recovers the information describing characteristic $f_{LOAD}$ via terminal 230. The values describing characteristic $f_{LOAD}$ in look-up circuit 228 are discrete by construction. A first operation of the calculation block thus is to make the description of the characteristic discontinuous. An embodiment of this operation is to use an interpolation method. Another embodiment is to calculate the coefficients of a polynomial to describe the characteristic. The details of interpolation algorithms or of calculation of coefficients of a polynomial are not discussed to describe a function. A second operation performed by block 232 is the calculation of inverse function $f^{-1}_{LOAD}$ of characteristic $f_{LOAD}$. This step may be performed by a simple transposition operation. Other methods may be used. An embodiment provides making the characteristic continuous in a first step and then calculating the inverse function in a second step. Another embodiment is to first perform the transposition operation and then the operation of interpolation or of polynomial coefficient calculation.

At a step S10 (UPDATE $f_{PRED}=f^{-1}_{LOAD}$), transfer function $f_{PRED}$ of block 224 is updated by substituting thereto function $f^{-1}_{LOAD}$ calculated at step S9:

$$f_{PRED}=f^{-1}_{LOAD}.$$

It is then returned to step S3.

A practical example of such a training method is described hereafter.

Switch 220 is switched off at step S1.

Function $f_{PRED}$ is initialized to an Identity function at step S2.

After steps S3, S4, S5, S6, and S7 repeated a sufficient number of times, for different values of voltage VCOM applied to terminal 224 of block 222 of application of transfer function $f_{PRED}$, one has stored in circuit 228 values VLOAD and ILOAD such that:

VLOAD=VCOMPRED with VCOMPRED=$f_{PRED}$(VCOM) and VCOMPRED=VCOM since $f_{PRED}$=Id That is:

$$VLOAD=VCOM \quad \text{(Equation 1)}$$

$$\text{and } ILOAD=VSENSE/R \quad \text{(Equation 2)}$$

These values describe characteristic $f_{LOAD}$ of the load.

At step S8, the error condition is not fulfilled since (VCOM−ILOAD)/VCOM is greater than a threshold Error:

ILOAD=$f_{LOAD}$(VLOAD) with VLOAD=VCOM according to (Equation 1)

Indeed: ILOAD=$f_{LOAD}$(VCOM)

Whereby the error:

$$\begin{aligned}(VCOM\text{-}ILOAD)/VCOM &= (VCOM\text{-}f_{LOAD}(VCOM))/VCOM\\ &= 1-f_{LOAD}(VCOM)/VCOM\end{aligned}$$

Microprocessor 401 then proceeds to step S9.

At steps S9 and S10, the microprocessor calculates inverse function $f^{-1}_{LOAD}$ of $f_{LOAD}$ and updates function $f_{PRED}$ according to:

$$f_{PRED}(VCOM)=f^{-1}_{LOAD}(VCOM)+\varepsilon 1(VCOM) \quad \text{(Equation 3)}$$

ε1 being an error function.

The microprocessor then returns to step S3 with a new defined transfer function $f_{PRED}$.

At steps S3, S4, S5, S6, S7, S12, repeated a number of times necessary for the desired application, quantities ILOAD and VLOAD enabling to describe characteristic $f_{Load}$ of load LOAD are constructed and stored again. This amounts to storing:

ILOAD=VSENSE/R such that VLOAD=VCOMPRED;

Now, VLOAD=$f_{PRED}$(VCOM).

By using (Equation 3):

$$VLOAD=f^{-1}_{LOAD}(VCOM)+\varepsilon 1(VCOM)$$

The value of ILOAD can be deduced:

$$ILOAD = f_{LOAD}(VLOAD). \quad \text{(Equation 4)}$$

-continued $$\begin{aligned}&= f_{LOAD}(f_{LOAD}^{-1}(VCOM)+\varepsilon 1(VCOM))\\ &= f_{LOAD}(f_{LOAD}^{-1}(VCOM))+f_{LOAD}(\varepsilon 1(VCOM))\\ ILOAD &= VCOM+\delta 1(VCOM),\end{aligned}$$

δ1 being an error function.

At the end of a number of iterations (branch Y of step S7), a function ILOAD has thus been described:

$$ILOAD=VCOM+\delta 1(VCOM).$$

At step S8, the error relative to threshold Error is assessed:

$$(VCOM-ILOAD)/VCOM=\delta 1(VCOM)/VCOM$$

If δ1(VCOM)/VCOM<Error for all the browsed VCOM, it is then proceeded to step S11.

In the opposite case, at steps S9 and S10, a new function $f_{PRED}$ is calculated and stored and it is returned to step S3 for a new iterations, that is, an execution of steps S3, S4, S5, S6, S7, S12 a given number of times to obtain a description of a function:

$$ILOAD=VCOM+\delta 2(VCOM),$$

δ2 being an error smaller than error δ1 for all the values of VCOM.

The new error:

(VCOM−ILOAD)/VCOM=δ2(VCOM)/VCOM will thus be smaller than the previous error.

Along the iterations, error (VCOM−ILOAD)/VCOM decreases to become smaller than threshold Error for all the values of VCOM.

It is then proceeded to step S11, during which switch 220 is turned on, which ends the training phase.

In an embodiment, the look-up table of circuit 228 is initialized by a first estimate of the characteristic of the load, which provides a faster convergence of the training phase.

Figure 5:
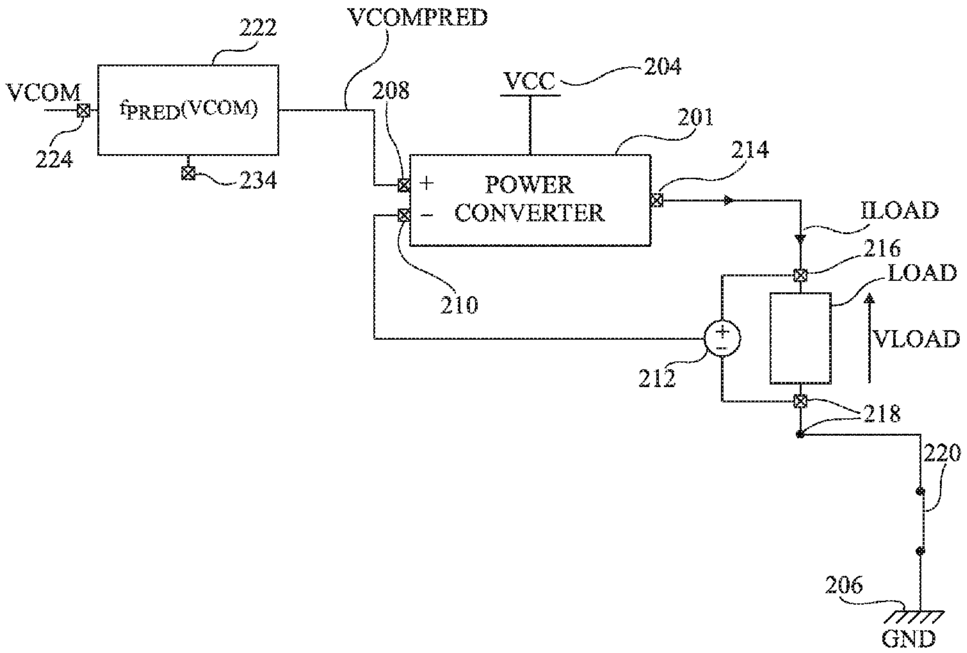
FIG. 5 shows a configuration of the device of FIG. 2 in standard operating mode.

At the end of the training phase, the device of FIG. 2 switches to a standard operating mode, as shown in FIG. 5.

FIG. 5 differs from FIG. 2 in that terminal 218 of load LOAD previously coupled to terminal 206 of connection to ground GND through resistor 202 is now directly grounded, due to the action of switch 220. Indeed, the switch is sized so that, when it is turned on, its electric operation is equivalent to that of a series resistor of negligible value as compared with the value of resistor R. Blocks 232 and 228 are not shown, since they are not active during the standard operating mode.

During the above-described training phase, a transfer function $f_{PRED}$ which is applied to any control voltage VCOM present on input terminal 224 of the device has been constructed. It has been seen that this function performs a pre-distortion so that any voltage VCOM is matched by the transfer function with a voltage VCOMPRED which corresponds to the application of a current ILOAD such that VCOMPRED=VLOAD.

In standard operating mode, the device thus control current ILOAD flowing through load LOAD according to a voltage VCOM present on its input terminal 224 without using resistor 202, which provides an energy performance gain.

In an embodiment, a resistor 202 of greater value than in usual devices for controlling the current in a load is used, which has the advantage of increasing the accuracy of the regulation with no penalty in terms of energy performance.

In an embodiment, to take into account variations of operating conditions, the training phase is repeated periodically or after an event. The trigger event may be the detection of a variation of temperature, of the power supply voltage, or of any other parameter affecting the operating conditions.

In an embodiment, a training phase is carried out for different operating conditions, for example, different operating temperatures, and the different transfer functions corresponding to each of the operating conditions are stored. When the operating conditions change, the corresponding transfer function is charged without going through a new training phase.

Specific embodiments have been described. Various alterations, modifications, and improvements will readily occur to those skilled in the art.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

The invention claimed is:

1. A method of controlling a current flowing through a load, comprising the steps of:

applying a first transfer function representative of the load to a first voltage to obtain a second voltage;

applying the second voltage to a first terminal of a circuit for generating said current;

sampling a third voltage between first and second terminals of the load;

comparing the third voltage with the second voltage; and determining the current to be supplied to the load according to the result of the comparison, wherein the first transfer function is determined by the steps of:

a) coupling said second terminal of the load to a resistor coupled to a terminal for application of a ground;

b) initializing the first transfer function;

c) constructing a second transfer function representative of the load by determining, for a plurality of values of the first voltage, the value of the current for which the value of the voltage sampled across the load is equal to the value of the first voltage having the first transfer function applied thereto;

d) using a function inverse of the second function to update the first transfer function;

e) repeating steps c) and d) until a condition is fulfilled; and f) coupling the second terminal of the load to the terminal of application of the ground.

2. The method of claim 1, wherein the initialization of the first transfer function is performed so that for any value of the first voltage, the resultant of the first transfer function is the actual value of the control voltage.

3. The method of claim 1, wherein the initialization of the first transfer function is performed by a first estimate of the characteristic of the load.

4. The method of claim 1, wherein the function inverse is calculated by an interpolation algorithm.

5. The method of claim 1, wherein the function inverse is calculated by calculating coefficients of a polynomial.

6. The method of claim 1, wherein step c) comprises the steps of:

c1) for each value of the first voltage, applying the first transfer function to obtain the second voltage;

c2) applying the second voltage to the first input terminal of the circuit for generating the current;

c3) applying the current in the load so that the voltage between first and second terminals of the load is equal to the second voltage;

c4) sampling a fourth voltage across the resistor; and c5) calculating the current flowing through the load and the resistor by dividing the fourth voltage by a resistance value of said resistor.

7. The method of claim 1, wherein said condition is considered as fulfilled when at least the result of an operation of composition of the first transfer function by the second transfer function is approximately equal to identity.

8. The method of claim 1, wherein steps a) to f) are periodically repeated.

9. The method of claim 1, wherein steps a) to f) are repeated when the operating conditions change.

10. The method of claim 1, wherein a plurality of first transfer functions are determined according to different operating conditions.

11. The method of claim 1, wherein the first terminal of the load is coupled to an output terminal of the current generation circuit, the second terminal of the load being coupled to a terminal of application of the ground.

12. A circuit, comprising:

a power converter circuit having a first input, a second input and an output;

a load coupled between the output and an intermediate node;

a resistor coupled between the intermediate node and a ground reference;

a switch circuit having a switch path coupled between the intermediate node and the ground reference;

a differencing circuit configured to sense a voltage drop across said load and supply said voltage drop to said second input;

a transfer function circuit having input configured to receive a first voltage and an output configured to generate a second voltage for application to said first input, the transfer function circuit applying a first transfer function representative of the load to the first voltage to obtain the second voltage; and a control circuit configured to deactuate the switch circuit and open said switch path during a training operation mode for determining said first transfer function and then actuate said switch circuit to close said switch path and short across the resistor during a normal operation mode.

13. The circuit of claim 12, wherein said control circuit is further configured, in said training operation mode, to:

construct a second transfer function representative of the load by determining, for a plurality of values of the first voltage, a value of current flowing through the load for which a value of the voltage drop is equal to the value of the first voltage having the first transfer function applied thereto; and use a function inverse of the second function to update the first transfer function.

14. The circuit of claim 13, wherein the function inverse is calculated by an interpolation algorithm.

15. The circuit of claim 13, wherein the function inverse is calculated by calculating coefficients of a polynomial.

16. The circuit of claim 13, further comprising starting from an initialization of the first transfer function.

17. The circuit of claim 16, wherein the initialization of the first transfer function is obtained as a first estimate of a characteristic of the load.

18. The circuit of claim 13, wherein the operation to construct the second transfer function comprises:
1) for each value of the first voltage, applying the first transfer function to obtain the second voltage;
2) applying the second voltage to the first input;
3) applying the current in the load so that the voltage drop is equal to the second voltage;
4) sampling a voltage across the resistor; and
5) calculating the current flowing through the load and the resistor by dividing the voltage across the resistor by a resistance value of said resistor.

19. A circuit, comprising:
a power converter circuit having a first input, a second input and an output;
a load coupled between the output and an intermediate node;
a resistor coupled between the intermediate node and a ground reference;
a switch circuit coupled between the intermediate node and the ground reference;
a differencing circuit configured to sense a voltage drop across said load and supply said voltage drop to said second input;
a transfer function circuit having input configured to receive a first voltage and an output configured to generate a second voltage for application to said first input, the transfer function circuit applying a first transfer function representative of the load to the first voltage to obtain the second voltage; and
a control circuit configured to deactuate the switch circuit during a training operation mode for determining said first transfer function and then actuate said switch circuit to bypass the resistor during a normal operation mode, wherein said control circuit is further configured, in said training operation mode, to:
construct a second transfer function representative of the load by determining, for a plurality of values of the first voltage, a value of current flowing through the load for which a value of the voltage drop is equal to the value of the first voltage having the first transfer function applied thereto; and
use a function inverse of the second function to update the first transfer function.

20. The circuit of claim 19, wherein the inverse to the second transfer function is calculated by an interpolation algorithm.

21. The circuit of claim 19, wherein the inverse to the second transfer function is calculated by calculating coefficients of a polynomial.

22. The circuit of claim 19, further comprising starting from an initialization of the first transfer function.

23. The circuit of claim 22, wherein the initialization of the first transfer function is obtained as a first estimate of a characteristic of the load.

24. The circuit of claim 19, wherein the operation to construct the second transfer function comprises:
a) for each value of the first voltage, applying the first transfer function to obtain the second voltage;
b) applying the second voltage to the first input;
c) applying the current in the load so that the voltage drop is equal to the second voltage;
d) sampling a voltage across the resistor; and
e) calculating the current flowing through the load and the resistor by dividing the voltage across the resistor by a resistance value of said resistor.

25. A method of controlling a current flowing through a load, comprising the steps of:
applying an input voltage to a first transfer function to obtain a reference voltage, said first transfer function being representative of a current versus voltage characteristic of the load;
comparing a feedback voltage to the reference voltage;
determining a value of said current to be supplied to the load in response to said comparison so that the feedback voltage equals the reference voltage; and
generating the feedback voltage as a voltage drop across the load in response to the current supplied to the load;
wherein the first transfer function is determined by the steps of:
a) passing said current through a resistor coupled in series with the load;
b) initializing the first transfer function;
c) constructing a second transfer function representative of a current versus voltage characteristic of the load by determining, for a plurality of values of the input voltage, the value of the current for which the feedback voltage is equal to the reference voltage;
d) using a function inverse of the second function to update the first transfer function;
e) disconnecting said resistor.

26. The method of claim 25, further comprising repeating steps c) and d) until a condition is fulfilled.

27. The method of claim 26, wherein said condition is fulfilled when at least the result of an operation of composition of the first transfer function by the second transfer function is approximately equal to identity.

28. The method of claim 25, wherein disconnecting comprises short-circuiting across the resistor.

29. The method of claim 25, wherein initializing the first transfer function comprises setting the first transfer function so that the reference voltage is equal to the input voltage.

30. The method of claim 25, wherein initializing the first transfer function comprises estimating estimate of the current versus voltage characteristic of the load.

31. The method of claim 25, further comprising using an interpolation algorithm to calculate the function inverse.

32. The method of claim 25, further comprising calculating coefficients of a polynomial to calculate the function inverse.

33. The method of claim 25, wherein step c) comprises the steps of:
c1) for each value of the input voltage, applying the first transfer function to obtain corresponding values of the reference voltage;
c2) for each value of the reference voltage, sensing a voltage drop across the resistor in response to said current for which the feedback voltage is equal to the reference voltage; and
c3) calculating a value of said current flowing through both the load and the resistor by dividing the voltage drop by a resistance value of said resistor.

* * * * *